United States Patent [19]
Abramitis

[11] 3,807,983

[45] Apr. 30, 1974

[54] QUATERNARY AMMONIUM AQUATIC HERBICIDES

[75] Inventor: Walter W. Abramitis, Downers Grove, Ill.

[73] Assignee: Akzona Incorporated, Asheville, N.C.

[22] Filed: Apr. 2, 1971

[21] Appl. No.: 130,837

[52] U.S. Cl.............................. 71/66, 11/67, 11/121
[51] Int. Cl............................................... A01n 1/20
[58] Field of Search........................ 71/66, 67, 121; 260/567.6 M; 424/329

[56] References Cited
UNITED STATES PATENTS

| | | | |
|---|---|---|---|
| 3,532,750 | 10/1970 | Crounse et al. | 260/567.6 M |
| 3,519,414 | 7/1970 | Nikawitz et al. | 71/121 |
| 3,498,998 | 3/1970 | Hughes et al. | 71/66 |
| 3,565,927 | 2/1971 | Wakeman et al. | 71/67 |
| 2,931,833 | 4/1960 | Matt | 260/567.6 M |
| 3,079,220 | 2/1963 | Boies et al. | 260/567.6 M |
| 3,444,200 | 5/1969 | Miller, Jr. et al. | 260/567.6 M |
| 3,482,961 | 12/1969 | Nickell et al. | 71/121 |
| 3,634,061 | 1/1972 | Geiger | 71/66 |
| 3,703,554 | 11/1972 | Bordenca | 71/66 |

*Primary Examiner*—Glennon H. Hollrah
*Attorney, Agent, or Firm*—Jack H. Hall

[57] ABSTRACT

A method for controlling the growth of aquatic plants by introducing a growth-inhibiting amount of a quaternary ammonium compound into the water in which said plants are growing, said quaternary ammonium compound having as one of its substituents an aliphatic hydrocarbon radical containing six to 22 carbon atoms selected from the group consisting of aliphatic radicals having primary and secondary carbon atoms attached to the nitrogen atom provided that in cases of primary carbon atoms there must be branching in the chain. In a typical application, concentrations of 0.25 to 10 parts by weight of toxicant per million parts of environing water are employed.

1 Claim, No Drawings

QUATERNARY AMMONIUM AQUATIC HERBICIDES

This invention relates to herbicides and more particularly to compositions and methods for killing or controlling the growth of undesirable aquatic plants or weeds.

In the broadest sense, weeds are any plants growing in abundance where they serve no useful purpose. Aquatic weeds, no less than their terrestrial counterparts, frequently grow in masses so dense as to become nuisances, creating problems of navigation, water flow, conduit stoppage, excessive water evaporation and the like. The aquatic weeds most commonly encountered and their general style of growth, are: duckweed (*Lemniceae*) — free-floating; elodea (*Vallisneriaceae*) and cabomba (*Cabombaceae*), — both free-floating or rooted and submerged; and sago pondweed (*Potamogeton*) and chara (*Characeae*) — both rooted and submerged.

Following countless years of rather unsatisfactory mechanical weed control operations such as dredging and mowing, chemical control methods have more recently been attempted, but with only partial success at best. In some instances, the toxicant was effective against one plant species but totally ineffective against others. Also, effective herbicides were sometimes found to be toxic to fish. Other problems associated with aquatic herbicides relate to water insolubility, ease of application, toxicity to terrestrial plants, high concentrations required for effective treatment and transitory or short-term effectiveness.

It is a principal object of this invention to provide an improved method, and novel compositions to be employed therein, for killing, suppressing and controlling aquatic plant growth.

Another object is to provide such a method in which the compositions are easy to apply but in which relatively small concentrations thereof are effective against a wide variety of plants over substantial time periods.

A further object is to provide such a method in which the compositions are safe and non-toxic to animal life, particularly fish, even when employed in concentrations considerably above that required for plant control.

In accordance with this invention, I have discovered a method for controlling the growth of aquatic plants by introducing a growth-inhibiting amount of a quaternary ammonium compound into water in which the aquatic plants are growing. The quaternary ammonium compounds employed in this invention have, as one of their substituents, an aliphatic hydrocarbon radical containing six to 22 carbon atoms. Further, the quaternary ammonium compounds employed in this invention have their nitrogen atom attached to either a primary or a secondary carbon atom. If the nitrogen atom is attached to a primary carbon atom, there must be some branching in the chain. Preferably, however, the aliphatic unsubstituted hydrocarbon radicals are alkyls or alkenyls. In addition to the unsubstituted aliphatic hydrocarbon, other substituents which may be employed are benzyl, alkoxy and/or alkyl radicals.

An extremely advantageous characteristic of the quaternary ammonium compounds used in this invention is that they are very toxic, even at relatively low concentrations, to a number of aquatic plants, including duckweed, elodea, cabomba, sago pondweed and chara. Another advantage of these compounds is their non-toxic effect on fish. Yet another advantage is that these compounds may be applied in a variety of forms. For example, they may be applied in solution, as a granular powder, as a mixture with clays or earths and in pellets designed for slow or fast release of toxicant. Preferably, the toxicants are applied as solutions made up in water or suitable organic solvents such as isopropanol, diacetone, alcohol, and the like. The quaternary ammonium compounds used in this invention may be mixed with previously known herbicides when it is desired, for example, to enhance the toxicity against a particular weed species. Once the desired physical forms of the quaternary compounds have been fixed, they are applied to the area wherein it is desired to kill or control aquatic weed growth. The application of the quaternary ammonium compounds must be such that a growth-inhibiting amount of toxicant is present to control or destroy the aquatic weed growth. Such amounts will vary, depending on such factors as the quantity of weeds present, the type of weed, the particular chemical used, and the temperature of the water. About 0.25 to about 10 parts by weight of toxicant per million parts of environing water may be used and preferably about 0.50 to about 5 parts per million. A particular advantage derived in using the quaternary ammonium compounds used in this invention for controlling or destroying the growth of aquatic plants lies in the non-toxic effect of such compounds on fish, even when used in concentrations as high as two times that required for effective herbicidal action.

The application of quaternary ammonium compounds, in which the nitrogen atom is attached to a primary carbon atom and having a straight chain alkyl radical as opposed to the branched chain quaternary ammonium compounds called for by the present invention, are found to be lethal to fish when applied at concentrations necessary to kill weeds and as used in the present invention. It may thus be theorized that the non-toxicity to fish of the quaternary ammonium compounds employed in this invention is in some measure attributable to their specifically defined structure.

In a preferred embodiment, the quaternary compound used in this invention is represented by the formula:

$$\left[ \begin{array}{c} R_1 \\ R-N-R_2 \\ R_3 \end{array} \right]^+ A^-$$

wherein R is an aliphatic radical, preferably selected from alkyl and alkenyl, containing about six to 22 carbon atoms and the carbon atom which is attached to the nitrogen atom being a primary or a secondary carbon atom, provided that if it is a primary carbon atom there must be branching in the hydrocarbon chain; $R_1$ is selected from the group consisting of alkyl having one to about three carbon atoms,

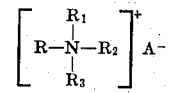

$$-(CH_2CH_2O)_aH, \text{ and } -\left( \begin{array}{c} CH_2CHO \\ | \\ CH_3 \end{array} \right)_a H;$$

$R_2$ is selected from the group consisting of alkyl having one to about three carbon atoms, $-(CH_2CH_2O)_bH$ provided $R_1$ is alkyl or $-(CH_2CH_2O)_aH$, and

provided $R_1$ is alkyl or

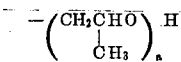

wherein $a$ and $b$ are integers having a sum of 1 to about 15; $R_3$ is selected from the group consisting of alkyl containing one to about three carbon atoms and benzyl; A is an anion.

Illustrative lower alkyls utilized for the $R_1$, $R_2$ and $R_3$ groups of the quaternary ammonium compound used in this invention are methyl, ethyl, propyl, and isopropyl. However, in a preferred embodiment $R_1$, $R_2$ and $R_3$ are all methyl.

Alkoxy radicals suitable for $R_1$ and $R_2$ are the reaction products of the amine with ethylene oxide or propylene oxide. It is well known in the art that ethylene oxide may replace an active hydrogen atom on a nitrogen atom and form linear adducts having ether linkages. The length of such adduct depends upon the molar ratio of the ethylene oxide to nitrogen groups. The addition of ethylene oxide to an amino nitrogen atom having more than one active hydrogen does not necessarily take place uniformly and therefore, the extent of ethoxylation of a nitrogen containing molecule is expressed by the molar ratio of ethylene oxide to the nitrogen containing compound.

The aliphatic hydrocarbon radicals for R are preferably selected from alkyls, alkenyls and hydroxy substituted alkyl having about six to 22 carbon atoms. Typical members include sec-hexyl, sec-heptyl, sec-octyl, sec-decyl, sec-nonyl, sec-dodecyl, sec-tridecyl, sec-tetradecyl, sec-pentadecyl, sec-hexadecyl, sec-heptadecyl, sec-octadecyl, sec-nonadecyl, sec-eicosyl, sec-heneicosyl, sec-docosyl, methylpentyl, methylhexyl, ethylhexyl, butylhexyl, methyloctenyl, methylheneicosyl, ethyleicosyl, butyloctadecyl, heptyloctyl, methyldodecyl, methyldodecenyl, hydroxyethyldodecyl, dodecyldecyl, hexyldecyl, hydroxyethylhexadecyl, methylhexadecenyl, methyloctadecyl and methyloctadecenyl. The branching may occur on any internal carbon atom in the hydrocarbon chain. The total number of carbon atoms in the straight chain and the branched portion is about six to 22. Ethylenic unsaturation may be at any position in the hydrocarbon chain and there may be hydroxy substitution on any carbon atom.

Preferred anions include $Cl^-$, $Br^-$, $OH^-$, $NO_2^-$, $NO_3^-$, acetate, benzoate, and salicylate. However, the most preferred anion is $Cl^-$.

The preparation of the quaternary ammonium compounds of this invention is well known to those skilled in the art, for example, as disclosed in U.S. Pat. No. 2,931,833. Illustrative members of such quaternary ammonium compounds are: triethyl-5-hexylammonium chloride, trimethyl-4-methylpentylammonium chloride, trimethyl-6-heptylammonium chloride, trimethyl-5-methylhexylammonium bromide, tripropyl-5-hexylammonium chloride, trimethyl-6-decylammonium chloride, trimethyl-5-methylnonylammonium chloride, trimethyl-2-docosylammonium nitrate, trimethyl-20-methylheneicosylammonium chloride, trimethyl-4-docosylammonium chloride, trimethyl-17-methylheneicosylammonium chloride,
dimethylpolyoxyethyl(1–15 moles)-5-hexylammonium chloride
dimethylpolyoxyethyl(1–15 moles)-4-methylpentylammonium chloride
dimethylpolyoxyethyl(1–15 moles)-2-heptylammonium chloride
dimethylpolyoxyethyl(1–15 moles)-5-methylhexylammonium salicylate
dimethylpolyoxyethyl(1–15 moles)-5-decylammonium chloride
dimethylpolyoxyethyl(1–15 moles)-5-methylnonylammonium bromide
diethyl polyoxyethyl(1–15 moles)-4-decylammonium chloride
dipropylpolyoxyethyl(1–15 moles)-5-methylnonylammonium chloride
dimethylpolyoxyethyl(1–15 moles)-2-docosylammonium bromide
dimethylpolyoxyethyl(1–15 moles)-20-methylheneicosylammonium chloride
dimethylpolyoxyethyl(1–15 moles)-4-docosylammonium hydroxide
dimethylpolyoxyethyl(1–15 moles)-17-methylheneicosylammonium chloride
dimethylpolyoxypropyl(1–15 moles)-2-hexylammonium chloride
dimethylpolyoxypropyl(1–15 moles)-4-methylpentylammonium chloride
diethylpolyoxypropyl(1–15 moles)-5-methylhexylammonium nitrite
dimethylpolyoxypropyl(1–15 moles)-4-decylammonium chloride
dimethylpolyoxypropyl(1–15 moles)-5-methylnonylammonium chloride
dimethylpolyoxypropyl(1–15 moles)-2-docosylammonium chloride
dimethylpolyoxypropyl(1–15 moles)-20-methylheneicosylammonium acetate
dimethylpolyoxypropyl(1–15 moles)-4-docosylammonium chloride
dimethylpolyoxypropyl(1–15 moles)-17-methylheneicosylammonium hydroxide
bis[polyoxyethyl(2–15 moles)]methyl-4-methylpentylammonium chloride
bis[polyoxyethyl(2–15 moles)]methyl-4-decylammonium chloride
bis[polyoxypropyl(2–15 moles)]methyl-2-docosylammonium bromide
bis [polyoxypropyl(2–15 moles)]methyl-5-methylpropylammonium chloride
benzyldimethyl-2-hexylammonium chloride
benzyldimethyl-4-methylpentylammonium chloride
benzyldimethyl-2-heptylammonium salicylate
benzyldipropyl-5-methylhexylammonium benzoate
benzyldimethyl-4-decylammonium chloride
benzyldimethyl-5-methylnonylammonium chloride
benzyldiethyl-4-decylammonium chloride
benzyldimethyl-2-docosylammonium chloride
benzyldipropyl-20-methylheneicosylammonium chloride
benzyldimethyl-17-methylheneicosylammonium nitrate
[polyoxyethyl(1–15 moles)]benzylmethyl-4-methylpentylammonium chloride

[polyoxyethyl(1-15 moles)]benzylmethyl-3-heptylammonium acetate
[polyoxyethyl(1-15 moles)]benzylmethyl-1-butylhexylammonium bromide
[polyoxyethyl(1-15 moles)]benzylethyl-4-decylammonium chloride
[polyoxyethyl(1-15 moles)]benzylpropyl-2-docosylammonium chloride
[polyoxyethyl(1-15 moles)]benzylmethyl-5-docosylammonium salicylate
[polyoxyethyl(1-15 moles)]benzylmethyl-15-methylheneicosylammonium chloride
[polyoxypropyl(1-15 moles)]benzylmethyl-4-methylpentylammonium chloride
[polyoxypropyl(1-15 moles)]benzylmethyl-5-methylhexylammonium chloride
[polyoxypropyl(1-15 moles)]benzylethyl-3-hexylammonium chloride
[polyoxypropyl(1-15 moles)]benzylmethyl-5-decylammonium chloride
[polyoxypropyl(1-15 moles)]benzylmethyl-3-methylnonylammonium chloride
[polyoxypropyl(1-15 moles)]benzylmethyl-13-methylheneicosylammonium chloride
[polyoxypropyl(1-15 moles)]benzylpropyl-9-docosylammonium bromide
[polyoxypropyl(1-15 moles)]benzylmethyl-20-methylheneicosylammonium chloride The preferred quaternary ammonium compounds of this invention include: trimethyl-8-pentadecylammonium chloride; trimethyl-2-(1-hydroxyethyl)dodecylammonium chloride; trimethyl-2-tridecylammonium chloride; and benzyldimethyl-2-(1-hydroxyethyl)decylammonium chloride.

The following Examples will more specifically describe the manner of carrying out this invention:

EXAMPLE 1

A 10 percent solution of trimethyl-8-pentadecylammonium chloride was prepared in water. This solution was employed for treatment of duckweed, elodea and cabomba growing in a series of tanks by pouring it into the tanks to concentrations varying from 0.5 to 4 parts by weight of toxicant per million parts of water. Other tanks containing the same species of plants were left untreated to serve as checks. Observations were carried out at intervals of 2, 4 and 6 weeks to determine the herbicidal effects. The observations are summarized in the Table I given below.

Untreated tanks contained full and luxuriant growths of the named plants at all times.

The same solution was poured into tanks containing goldfish, to concentrations of 5 and 10 by weight of toxicant per million parts of water. Observations were made at 24-hour intervals to determine toxicity, if any, to the fish. The results are shown below in Table II.

TABLE II

| Compound concentration in parts per million | Percent kill of goldfish at indicated hours after treatment | | | |
|---|---|---|---|---|
| | 24 | 48 | 72 | 96 |
| 5 | 0 | 0 | 0 | 0 |
| 10 | 0 | 0 | 0 | 0 |

EXAMPLE 2

A test solution of 10 percent trimethyl-8-pentadecylammonium chloride was prepared in a 10 percent solution of isopropanol in water. The test solution was prepared and added to a series of tanks containing duckweed, elodea, cabomba, sago pondweed and chara to a concentration of 4 parts by weight of toxicant per million parts of water. Other tanks containing the same species of plants were left untreated to serve as bases for comparison. Observations which were carried out at intervals of 2, 4 and 6 weeks are summarized in Table III given below.

TABLE III

| Weeks after treatment | Percent kill of plant species at indicated time | | | | |
|---|---|---|---|---|---|
| | duckweed | elodea | cabomba | sago pondweed | chara |
| 2 | 100 | 99 | 5 | 60 | 100 |
| 4 | 100 | 100 | 78 | 100 | — |
| 6 | 100 | 100 | 96.5 | 100 | 90 |

The untreated tanks contained full and luxuriant growths of the named plants at all times.

The same solution was poured into a tank, containing goldfish, to a concentration of 5 parts by weight of toxicant per million parts of water. Observations made at intervals of 24, 48, 72 and 96 hours showed no fish killed.

TABLE I

| Compound Concentration in parts per million | Weeks after treatment | Percent kill of plant species at indicated concentration and time | | |
|---|---|---|---|---|
| | | DUCKWEED | ELODEA | CABOMBA |
| 4 | 2 | 100 | 100 | 10 |
| | 4 | 100 | 100 | 86.5 |
| | 6 | 100 | 100 | 80 |
| 2 | 2 | 100 | 79 | 0 |
| | 4 | 100 | 95 | 5 |
| | 6 | 100 | 90 | 25 |
| 0.5 | 2 | 95 | 20 | 0 |
| | 4 | 96.5 | 15 | 25 |
| | 6 | 95 | 0 | 10 |

EXAMPLE 3

A 10 percent benzyl dimethyl-2-(1-hydroxyethyl)-decylammonium chloride test solution was prepared in a 10 percent solution of dimethylformamide in isopropanol. The test solution was added to a series of tanks, containing the duckweed, elodea, sago pondweed and chara to a concentration of 4 parts by weight of toxicant per million parts of water. The results of observations carried out at intervals of 2 weeks are summarized in the Table IV given below.

TABLE VI

| Weeks after treatment | Percent kill of plant species at indicated time | | | |
|---|---|---|---|---|
| | duckweed | elodea | sago pondweed | chara |
| 2 | 20 | 95 | 10 | 12.5 |

The same solution was poured into a tank, containing goldfish, to a concentration of 5 parts by weight of toxicant per million parts of water. There were no fish killed after 24, 48, 72 or 96 hours.

EXAMPLE 4

A 10 percent trimethyl-2-tridecylammonium chloride solution was prepared in diacetone alcohol. This solution was added to a series of tanks containing duckweed, elodea, cabomba, and sago pondweed, to concentrations of 2, 4, and 5 parts by weight of toxicant per million parts of water. Observations noted at the end of 2, 4 and 6 weeks are summarized below in Table V.

Table V

| Compound Concentration in parts per million | Weeks after treatment | Percent kill of plant species at indicated concentration & time | | | |
|---|---|---|---|---|---|
| | | duckweed | elodea | cabomba | sago pondweed |
| 5 | 2 | 96.5 | 100 | 10 | |
| | 4 | 97.5 | 100 | 25 | |
| | 6 | 94 | 100 | 30 | |
| 4 | 2 | 84 | 84 | 0 | 25 |
| | 4 | 97 | 100 | 10 | 100 |
| | 6 | 94.5 | 100 | 10 | 100 |
| 2 | 2 | 80 | 20 | 0 | 85 |
| | 4 | 92.5 | 15 | 0 | 80 |
| | 6 | 87.5 | 10 | 10 | 100 |

The same solution was poured into a tank, containing goldfish, to a concentration of 5 parts per million. There were no dead fish after 24, 48, 72 or 96 hours.

EXAMPLE 5

A 5 percent trimethyl-2-(1-hydroxyethyl)dodecylammonium chloride in water solution was prepared and added to a series of tanks containing duckweed, elodea and sago pondweed to a concentration of 4 parts by weight of toxicant per million parts of water. Observation carried out at intervals of 2, 4 and 6 weeks are summarized in Table VI given below.

Table VI

| Weeks after treatment | Percent kill of plant species at indicated time | | |
|---|---|---|---|
| | duckweed | elodea | sago pondweed |
| 2 | 45 | 90 | 45 |
| 4 | 20 | 100 | 100 |
| 6 | 85 | 100 | 100 |

The same solution was poured into a tank, containing goldfish, to a concentration of 5 parts by weight of toxicant per million parts of water. There were no dead fish after 24, 48, 72 or 96 hours.

EXAMPLE 6

A mixture of equal parts by weight of trimethyl-8-pentadecylammonium chloride and potassium-2-(2,4,5-trichlorophenoxy) propionate (Kurosal SL) was prepared. This mixture was used to treat duckweed, elodea and cabomba growing in a series of tanks. The mixture was applied to concentrations of 4 parts by weight of toxicant per million parts of water (2 parts of each constituent) and 2 parts by weight of toxicant per million parts of water (1 part of each constituent.) After 6 weeks the percent kill of all three plant species subjected to the toxicant concentration of 4 parts by weight of toxicant per million parts of water was 65–100 percent and for the plant species subjected to toxicant of 2 parts per million 30–95 percent kill. In both instances the percent kill was higher than that achieved by equivalent amounts of Kurosal SL alone.

EXAMPLE 7

A mixture was prepared of equal parts, by weight, of trimethyl-2-tridecylammonium chloride and a dimethylcocoamine mono-salt of 3–6 endoxohexahydrophthalic acid, the latter known to be effective against chara. The mixture was applied to a pond in Florida to a concentration of 4 parts per million (2 parts of each constituent) and, after 6 weeks, the percent kill of elodea and chara was 95 percent and 85 percent respectively. Also killed was 95 percent of the plant Hydrilla indigenous to the area.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A method for controlling the growth of aquatic plants without endangering fish life by introducing a growth-inhibiting amount up to a maximum of 10 parts by weight per million of a quaternary ammonium compound into the water in which said plants are growing, said quaternary ammonium compound being selected from the group consisting of trimethyl-8-pentadecyl ammonium chloride, trimethyl-2-tridecylammonium chloride, trimethyl-2-(1-hydroxyethyl)-dodecylammonium chloride and benzyl dimethyl-2-(1-hydroxyethyl)-decylammonium chloride.

* * * * *